Jan. 9, 1968     J. W. FRIED     3,362,268
RECESSING TOOL
Original Filed Nov. 5, 1963     5 Sheets-Sheet 1
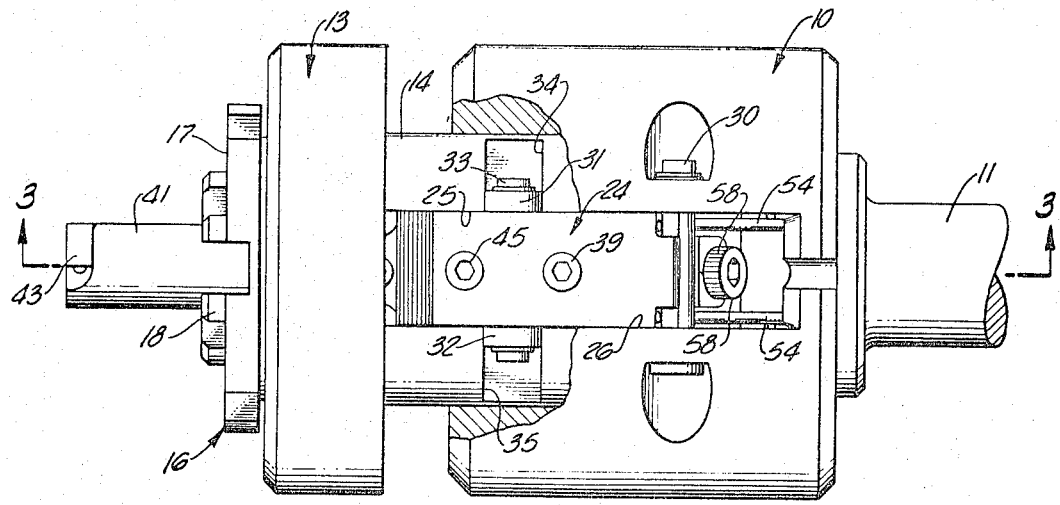
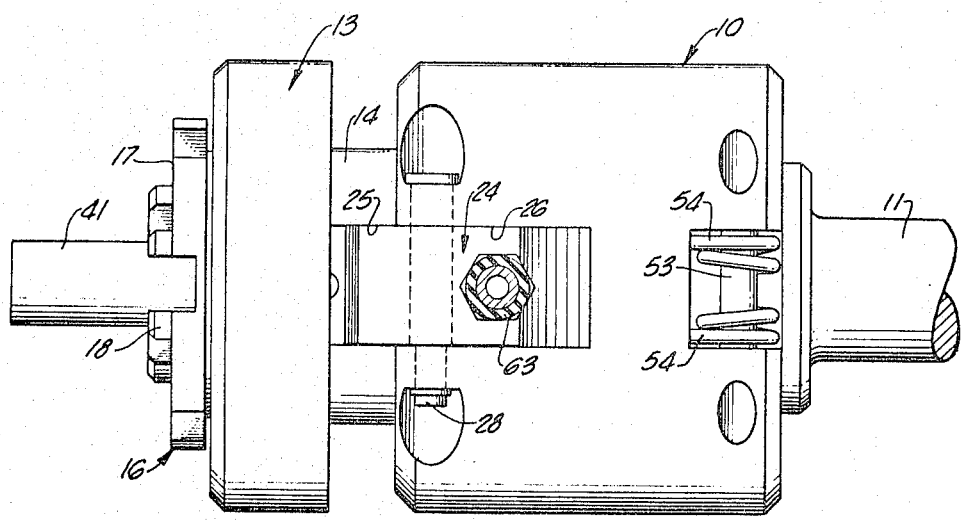
INVENTOR.
JOSEPH W. FRIED
BY
ATTORNEYS

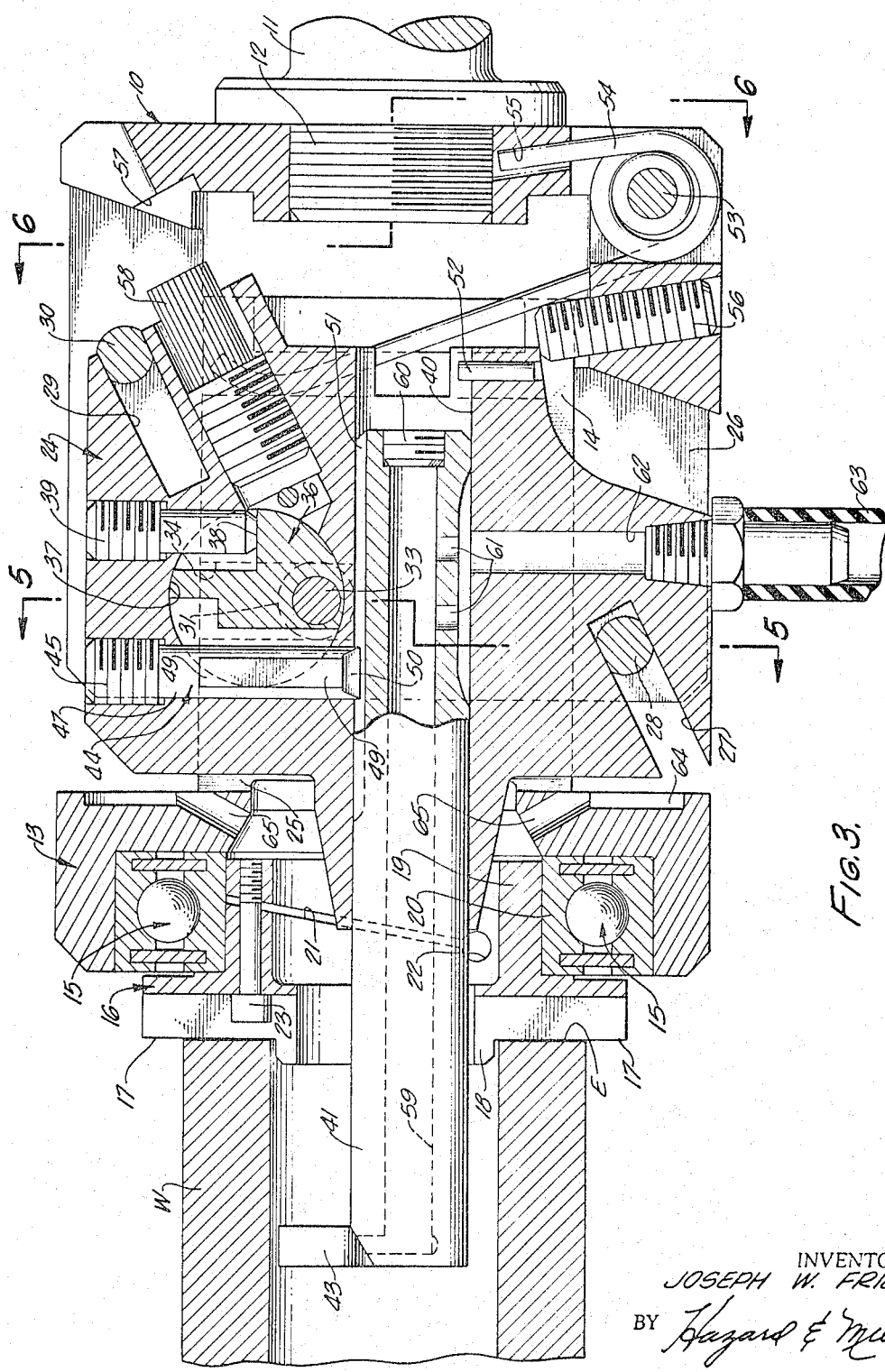

Jan. 9, 1968

J. W. FRIED 3,362,268

RECESSING TOOL

Original Filed Nov. 5, 1963

INVENTOR.
JOSEPH W. FRIED

BY Hazard & Miller

ATTORNEYS

INVENTOR.
JOSEPH W. FRIED

BY *Hazard & Miller*

ATTORNEYS

United States Patent Office 3,362,268
Patented Jan. 9, 1968

3,362,268
RECESSING TOOL
Joseph W. Fried, 4619 Nagle Ave.,
Sherman Oaks, Calif. 91403
Continuation of abandoned application Ser. No. 321,523, Nov. 5, 1963. This application Mar. 14, 1966, Ser. No. 534,138
17 Claims. (Cl. 82—1)

This application is a continuation of my application entitled, "Recessing Tool," which was filed on Nov. 5, 1963, Ser. No. 321,523, and now abandoned.

This invention relates to improvements in recessing tools designed to either internally or externally cut recesses in work pieces.

In a typical situation in which the tool embodying the present invention is used, a tubular or hollow work piece is to have an annular groove internally cut in its walls a precise distance from the end of the work piece, the end of the work piece being used as a datum or point of orientation from which the groove is precisely spaced. In accordance with the present invention, if a part of the tool is pressed against the end of the work piece the cutter of the cutting tool will be positioned precisely the desired distance from the end and will be radially advanced into the wall without pivoting or swinging movement enabling the walls of the groove cut by the cutter to be perfectly parallel to each other if such is desired and at right angles to the longitudinal axis of the work piece.

A primary object of the invention is to provide a tool of this character wherein the parts are so designed as to be susceptible of precise movements to effect the desired cut on the work as the work-engaging end of the tool is pressed against the end of the work.

More specifically, an object of the invention is to provide a recessing tool consisting essentially of a body relative to which a work-engaging member is longitudinally or axially movable. A tool carrier is guided by the body for movements on a path that is inclined to the longitudinal axis of the body and also guided for movements at right angles to the longitudinal axis of the work-engaging member. Consequently, as the body is moved in a direction toward the work and the work-engaging member is forced into the body, the tool-carrying member will be moved in a path at right angles to the axis of the work-engaging member and move the tool carried thereby in a direction that is precisely at right angles to the axis of the work-engaging member and the work.

Another object of the invention is to provide a tool having the above-mentioned characteristics which is so designed that the mounting of the tool in the tool-carrying member is accessible readily from the exterior of the device so that tools can be readily removed and replaced as occasionally required.

Another object of the invention is to provide a novel and simple fine adjustment for longitudinally adjusting the position of the path of the tool-carrying member and consequently the tool relative to the end face of the work-engaging member. This adjustment is also readily accessible from the exterior of the device to finely and accurately position the exact location of the cutter of the tool with respect to the work-engaging face of the device.

Still another object of the invention is to provide a novel and simple means for firmly attaching and detaching replaceable face plates which engage the end of the work piece and which are used to accurately position the cutter of the tool with respect to the end of the work piece.

With the foregoing and other objects in view, which will be made manifest in the following detailed description and specifically pointed out in the appended claims, reference is had to the accompanying drawings for an illustrative embodiment of the invention, wherein:

FIGURE 1 may be regarded as a top plan view of the device embodying the present invention;

FIG. 2 may be regarded as a bottom plan view of the same;

FIG. 3 is a sectional view on an enlarged scale taken substantially upon the line 3—3 upon FIG. 1 in the direction indicated and illustrating the parts in position wherein the tool is in retracted position relative to the work;

Figure 4:
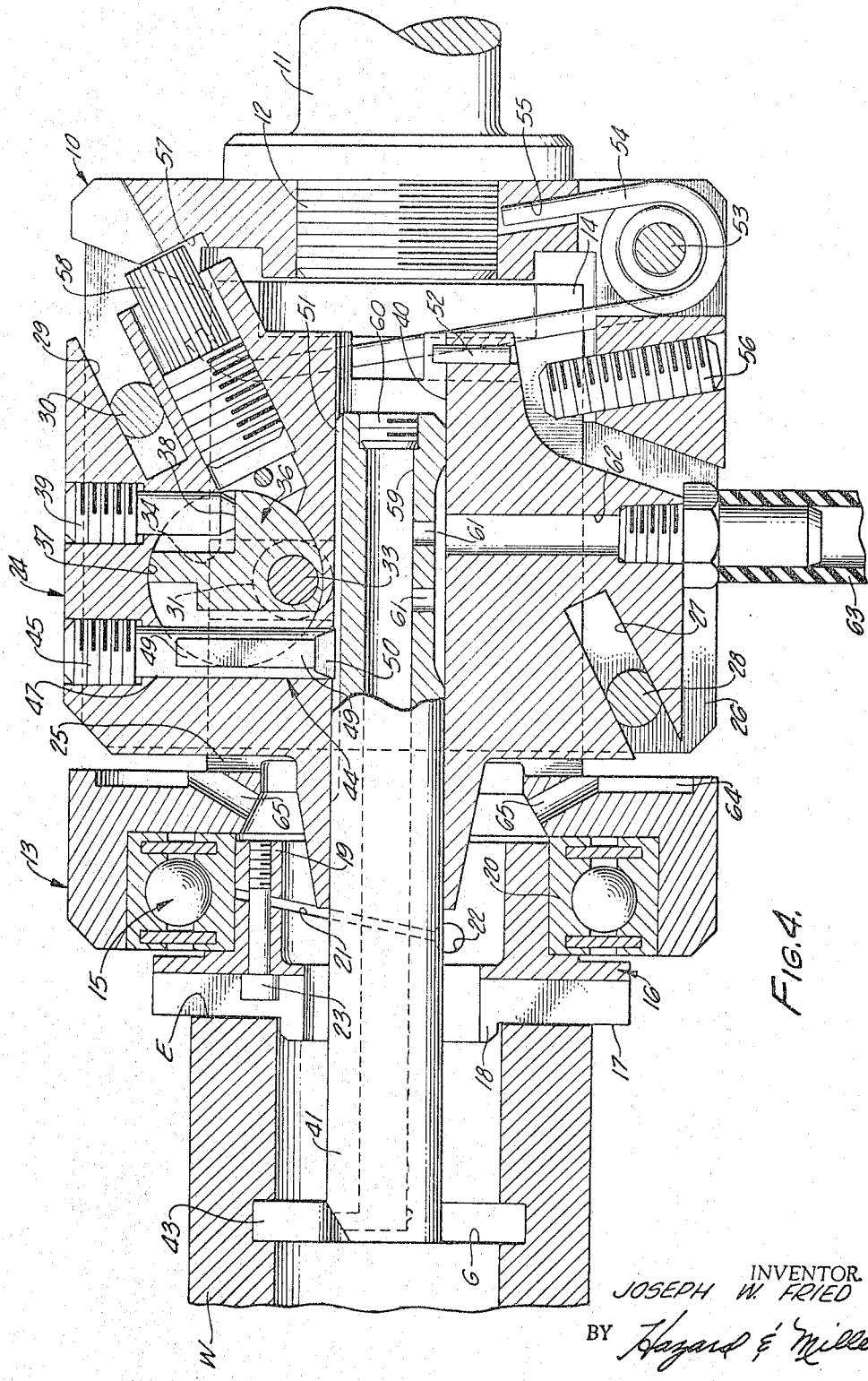
FIG. 4 is a view similar to FIG. 3 but illustrating the parts in position wherein the tool has been advanced into the work to cut an internal groove therein.
Figure 5:
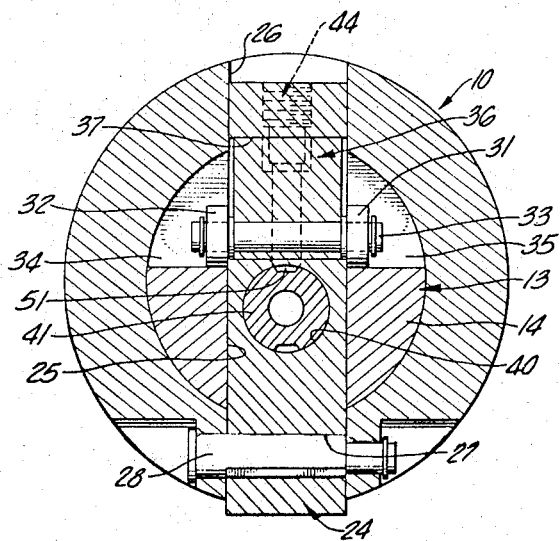
FIG. 5 is a vertical section taken substantially upon the line 5—5 upon FIG. 3 in the direction indicated.

Referring to the accompanying drawings wherein similar reference characters designate similar parts throughout, a typical situation in which the device embodying the present invention is used is where a groove G (see FIG. 4) is to be cut on the interior of a hollow work piece W a precise distance from the end E of the work piece. Frequently the work piece W is held stationary and the device is rotated to effect a rotation of the cutter in the interior of the work piece while the cutting of the groove G is being accomplished. This, however, is not universally true in as much as the device may be held stationary and the work piece W rotated relatively thereto. As the first situation is apt to be more common the device embodying the present invention will be described as if the work piece W were held stationary and the device was rotated relatively thereto and fed towards the end E of the work piece.

To this end the recessing tool consists of a body generally indicated at 10 having a shank 11 either integral therewith or attached to the body such as by a threaded connection 12. The shank 11 can be mounted in the chuck of a lathe, drill press, boring machine or the equivalent and can be rotated thereby and axially advanced toward the work piece W. At the opposite end of the body there is the body 13 of a work-engaging member which has a stem 14 that telescopes into the body 10. The body 13 of the work-engaging member does not itself engage the end face E of the work piece W but serves to house an antifriction bearing 15 within which is mounted a replaceable face plate 16 the face of which, indicated at 17, is designed to engage the face E. Preferably, but not necessarily, this face plate has a centering hub 18 that projects forwardly beyond the face 17 and which may enter the hollow interior of the work piece W. The face plate also has a rearwardly extending hub 19 that telescopically fits within the inner race 20 of the antifriction bearing 15. The hub 19 is transversely divided as indicated at 21 which division or split extends preferably more than half way across the hub and terminates in an opening 22. This divides the hub into two portions one of which is rigid with the face plate 16 and the other of which is slightly bendable about the opening 22 as a center. A set screw 23 connects the bendable portion of the hub 19 to the rigid portion and on being tightened will cause the bendable portion to spring or bend slightly about the opening 22 as a center. In so doing, the exterior surface of the bendable portion of the hub 19 swings about an arc and will frictionally grip the interior of the race 20 with great tightness. Consequently the face plate 16 which engages the end face E of the work W is rotatable relative to the body 13 by means of antifriction bearing 15 but when occasion required the substitution or replacement of the face plate 16 this can be accomplished quite readily by loosening the set screw 23 thus allowing the bendable portion of hub 19 to return to its normal position wherein the entire hub 19 can be slidably telescoped out of the race 20 of the bearing.

The body 13 and its stem 14 although they may telescope rearwardly relative to the body 10, are held against rotation relatively thereto by a tool carrier 24. This tool carrier is disposed partially in a slot 25 in the stem 14 and partially in a slot 26 in the body 10, thus in effect keying the body 13 and its stem 14 in relation to the body 10 while at the same time permitting the body 13 and stem 14 to telescope rearwardly relative to body 10. The tool carrier 24 is guided at two points arranged on opposite sides of the axis of body 10 for movement on a path that in inclined to the axis of the body 10. Thus the tool carrier has an inclined slot 27 the walls of which are parallel to each other and which fit against the flats of a transversely extending pin 28 that extends across the body. On the opposite side of the axis of the body 10 the tool carrier 24 has a parallel slot 29 the walls of which are parallel to each other and parallel to the walls of the slot 27. The walls of slot 29 bear against the flats on the sides of a transversely extending pin 30 that extends transversely through the body. Movements of the tool carrier 24 are thus guided or confined to a path that is inclined to the axis of body 10 that is guided by the walls of slots 27 and 29 sliding against the flats on the sides of the pins 28 and 30. While the tool carrier 24 can thus move on an inclined path relative to body 10 its movement relative to the work-engaging member 13, 14 is restricted to a path that is in a plane perpendicular to the axis of the work-engaging member. This is accomplished by rollers 31 and 32 on the ends of a pin 33 that extends transversely through the tool-carrying member 24 and which are disposed in vertical slots 34 and 35 in the stem 14. The walls of these slots are parallel to each other and are perpendicular to the axis of the stem 14 so that movements of the tool carrier 24 relative to the work-engaging member are restricted to the plane perpendicular to the axis. The pin 33 is located eccentrically with respect to the center of a rotary adjuster 36 the exterior of which is largely cylindrical and fits within a cylindrical opening 37 that extends transversely through the tool carrier 24. A portion of this rotary adjusted is removed to provide a shoulder or ledge 48 engageable by an adjusting screw 39 the head of which is disposed on the exterior of the tool carrier. By adjusting the adjusting screw 39 the adjuster 36 can be rotated about its center which will shift the pin 33 either forwardly or rearwardly and finely adjust the position of the tool carrier 24 in relation to the sides of slots 34 and 35 in the stem 14. In this manner the position of the tool carrier 24 with relation to the work-engaging member body 13 or in relation to the face 17 of face plate 16 can be precisely located.

Figure 7:
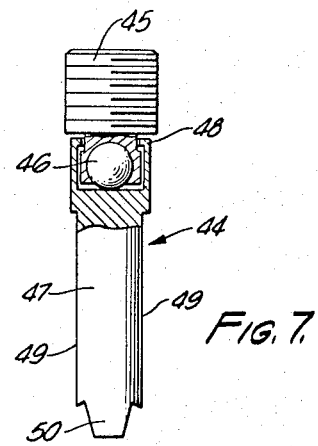
FIG. 7 is a view in side elevation parts being broken away and shown in vertical section of the set screw or holder that clamps the selected tool in the tool holder.
Figure 6:
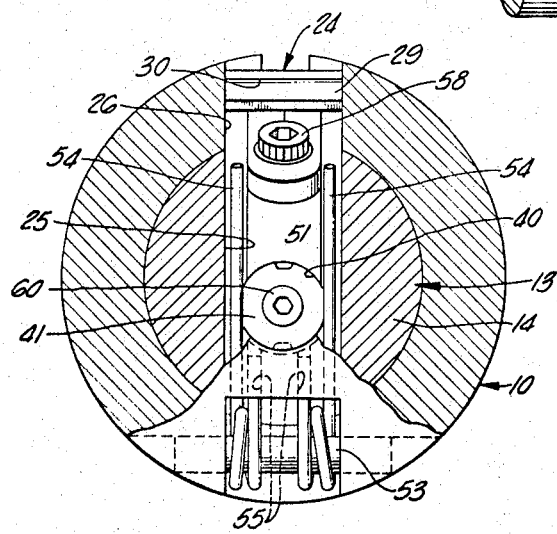
FIG. 6 is a sectional view taken substantially upon the line 6—6 upon FIG. 3 in the direction indicated.

The tool carrier member 24 has an axial bore therethrough, indicated at 40. This bore is designed to receive a boring bar 41 or tool having a radial cutter 43. The boring bar or cutting tool is positioned in the bore 40 and is clamped therein by means of a clamping screw generally indicated at 44, see FIG. 7. This consists of an outer screw 45 the head of which is exposed on the exterior of the tool carrier 24 and which provides at its inner end a socket for a ball 46. The shank 47 is crimped or spun inwardly as at 48 around the inner end of the screw 45 to retain the screw and shank together. In effect the ball 46 thus forms an anti-friction swiveled connection between the shank 47 and the screw 45 enabling the shank 47 to be forcibly withdrawn from the tool carrier 24 by the screw 45 whenever occasion should require. The sides of the shank are preferably flatted, as indicated at 49, fitting against corresponding surfaces broached in the tool carrier 24 and adjuster 36 and the shank 47 terminates in a key 50 that fits in a longitudinally extending keyway 51 in the shank of the boring bar 41. When the boring bar and its cutter are applied to the device the shank is merely inserted into the axial bore 40 the approximate distance to approximately position the cutter 43 the desired distance from the end face E of the work. Fine or precise adjustment is accomplished after the set screw 44 has been tightened against the boring bar 41 by turning the adjusting screw 39 and rotating the adjuster 36. A stop pin 52 projects into the bore 40 and serves to limit the extent to which the boring bar 41 can be forced rearwardly into the bore 40.

A pin 53 extends transversely across the body adjacent its rear end and serves to mount springs 54 on the body. One end of each spring is disposed in an aperture 55 in the body and the other end of each spring bears against the end of the tool carrier 24 constantly urging the tool carrier forwardly relatively to the body. These springs, however, yieldably permit the work-engaging member 13, its stem 14, and the tool carrying member 24 to be moved forcibly toward the rear of the body 10.

The body also serves to mount an adjustable stop screw 56 which is arranged in the path of movement of the tool carrier 24 relative to body 10 to limit its forward movement, as illustrated in FIG. 3. The body also provides a stop shoulder 57 engageable by a stop screw 58 that is threaded into the tool carrier 24. When the stop screw 58 engages the shoulder 57 rearward movement of the tool carrier, the work-engaging body 13, and the stem 14 is arrested or limited.

The operation of the device is substantially as follows: Assuming that the work W is stationary and that the shank 11 can be forcibly rotated and axially advanced, the boring bar 41 and its cutter 43 are inserted into the work and the face 17 of the face plate 16 is caused to engage the end face E of the work. This precisely locates the position of the cutter 43 with relation to the end face E, it being assumed that whatever adjustments that were necessary have been made by adjusting the adjusting screw 39 and the adjuster 36. The shank 11 is then rotated and moved in a direction toward the work piece W. As this movement continues the tool carrier 24 is caused to follow the inclined path relative to body 10 dictated by the inclined slots 27 and 29 and on a path at right angles to the axis of the work-engaging body 13 and its stem 14. Consequently the boring bar 41 and its cutter 43 will be moved at right angles to the axis of the work-engaging member 13. The extent to which the cutter 43 is caused to penetrate the work is governed by the extent to which the body 10 moves forwardly relative to the work-engaging member 13 until such movement is limited by the engagement of stop screw 58 with shoulder 57. When this occurs the groove G has been cut to the required depth. The shank 11 can then be caused to recede from the work and as it recedes the springs 54 become effective to return the tool carrier 24 to the initial position shown in FIG. 3 wherein the boring bar 41 and its cutter 43 can be withdrawn from the work W. If the recessing tool is stationary and the work W is rotated relatively thereto the boring bar is preferably hollow as indicated at 59 and closed at its rear end by a plug 60. This hollow interior discharges adjacent the cutter 43 and communicates through apertures 61 with a passage 62 that is fed or supplied with a coolant through a hose 63. The coolant being thus supplied will be discharged from the boring bar adjacent the cutter 43 for cooling purposes. If the recessing tool is vertically mounted and is rotatable the hose 63 is disconnected but the body 13 is equipped with an annular channel 64 which can be supplied with a coolant that passes through passages 65 and through the face plate 16 to be discharged adjacent the cutter.

It will be appreciated that the arrangement and design of the parts is such that precise location and adjustment of the position of cutter 43 relative to the end face E can be easily and quickly accomplished. During the operation it is merely necessary to force the tool toward the end of the work piece and either rotate the recessing tool relative to the work or rotate the work relative to the tool. In either event movements of the cutter 43 are restricted to movements that are precisely radial and precisely located relative to the end face E of the work.

Figure 10:
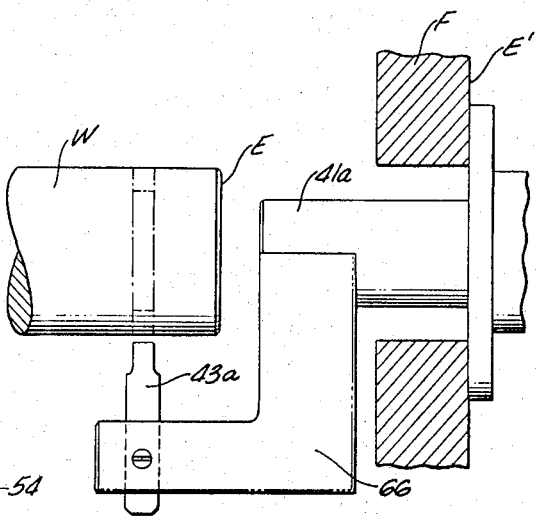
FIG. 10 is a partial view illustrating a modification that may be employed to cut external grooves in the work as distinguished from internal grooves.
Figure 8:
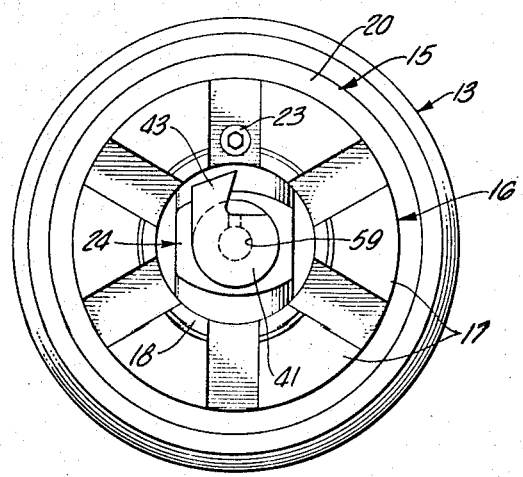
FIG. 8 is a view in end elevation of the forward end of the device.
Figure 9:
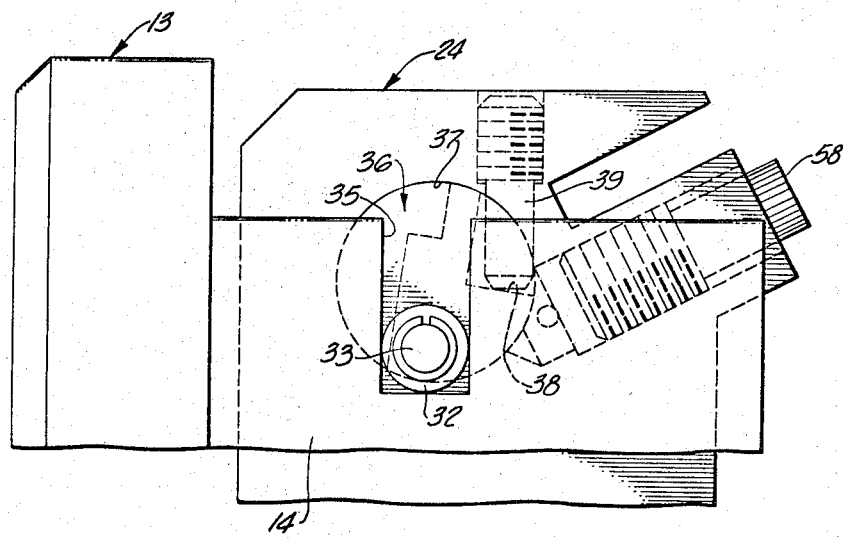
FIG. 9 is a partial view in side elevation illustrating a portion of the device and the manner in which fine adjustments of the position of the cutter of the tool with respect to the face plate can be accomplished.

In FIG. 10 there is illustrated a slightly modified form of construction wherein the boring bar 41a has the cutter 43a mounted thereon by means of an arm 66. In this form of construction the cutter 43a may cut an external groove in the work W rather than an internal groove as depicted in the earlier figures. In this form of construction, as the end face E of the work cannot be engaged directly a fixture F is provided the face E' of which has a definite or known location with respect to the end face E. When the face 17 of face plate 16 engages the face E' of the fixture F the cutter 43a will be precisely located with respect to the end face E of the work. Otherwise the operation of the construction depicted in FIG. 10 is the same as that previously described.

I claim:

1. A tool of the class described comprising a body having an axis of rotation and a longitudinal slot defined by flat side faces parallel to said axis of rotation, said body having means at its rear portion for direct supporting connection with a lathe chuck and the like, said body having an axial bore, work-engageable means forwardly of the body and having a portion slidable in said bore, said work-engageable means having a longitudinal slot defined by flat side faces parallel to said axis in planes coincident with those of the flat side faces of the slot in said body, a tool carrier having flat parallel sides closely and slidably positioned between the flat side faces of the longitudinal slots of said body and said work-engageable member, and means interengaging said body and said tool carrier translating axial movement of the body to movement of the tool carrier transversely of the body.

2. The structure in claim 1, and said means interengaging said body and tool carrier comprising inclined guide and follower means located radially outwardly with respect to said axial bore.

3. The structure in claim 1, and said guide and follower means comprising guide and follower units symmetrically located radially outwardly of and at opposite sides of said axial bore.

4. The structure in claim 1, and said interengaging means including at least a pair of spaced non-aligned inclined guides having parallel guide paths, and followers for said guides.

5. The structure in claim 1, and torsion spring means carried by the body and having arms effective to yieldably urge the tool carrier diametrically and the work-engageable means forwardly relative to the body.

6. The structure in claim 5, and said torsion spring having its longitudinal axis disposed transversely of said body.

7. The structure in claim 5, and said torsion spring having its longitudinal axis disposed transversely of said body, said arm comprising a lever arm yieldably engaging and urging the tool carrier forwardly, said inter-engaging means comprising guide means inclined relative to said axis of rotation, and said lever arm having its outer end movable in an arc whose longest chord is substantially parallel to the guide path of said inclined guide means.

8. The structure in claim 1, and said tool carrier being engaged by said work-engageable means and movable thereby axially in the longitudinal slot in said body.

9. The structure in claim 8, and means interposed between the work-engageable means and said tool carrier providing movement of the tool carrier transversely of said axis of rotation and relative to the work-engagable means.

10. The structure in claim 8, and said means interposed between the work-engageable means and said tool carrier providing movement of the tool carrier transversely of said axis of rotation and relative to the work-engageable means, and said means interengaging said body and tool carrier comprising inclined guide and follower means for imparting motion to the tool carrier transversely of said axis of rotation.

11. The structure in claim 1, and means interposed between said work-engageable means and said tool carrier comprising a guide and a cooperating guide follower at each side of the tool carrier.

12. The structure in claim 1, and said means interengaging said body and said tool carrier comprising at least a pair of guide and follower units spaced from each other axially of the body.

13. The structure in claim 1, and said means interengaging the body and the tool carrier comprising at least two guide slot means, each with a flat wall, guide follower pins having flat surfaces slidably engaging the flat walls of the slots, and said guide pins being mounted for rotary oscillation to provide flat-surface-to-flat-wall alignment of said guide follower pins.

14. A tool of the class described comprising a body having an axis of rotation and a longitudinal slot defined by flat side faces parallel to said axis of rotation, said body having means for direct supporting connection with a lathe chuck and the like, work-engageable means axially movable in the body, a tool carrier mounted for transverse movement in the work-engageable means and having flat parallel sides located between and slidably engaging the parallel side faces of the slot in said body, inclined means restricting the tool carrier to a path diametrical to the body, a tool mounted on the tool carrier, spring means yieldably urging the work-engageable means and tool carrier into their foremost positions relative to the body, and a tool carried by the tool carrier and moveable laterally therewith, and means for varying the position of the path of lateral movement of the tool carrier relative to the work-engaging means, whereby, when the body moves forwardly relative to the work-engageable means, the tool carrier will be caused to move laterally relative thereto.

15. A tool of the class described comprising a body having an axis of rotation and a longitudinal slot defined by flat side faces parallel to said axis of rotation, said body having means for direct supporting connection with a lathe chuck and the like, work-engageable means axially movable in the body, a tool carrier mounted for transverse movement in the work-engageable means and having flat parallel sides located between and slidably engaging the parallel side faces of the slot in said body, inclined means restricting the tool carrier to a path diametrical to the body, a tool mounted on the tool carrier, spring means yieldably urging the work-engageable means and tool carrier into their foremost positions relative to the body, and a tool carried by the tool carrier and movable laterally therewith, and means for varying the position of the path of lateral movement of the tool carrier relative to the work-engaging means, means engaging and movable relative to and directly connecting the work-engageable member and the tool carrier providing a vernier adjustment of the tool carrier axially of the tool and relative to the work-engaging member, whereby, when the body moves forwardly relative to the work-engageable means, the tool carrier will be cause to move laterally thereto and move the tool laterally relative to the body and the work-engageable means.

16. A tool of the class described comprising a body having an axis of rotation and a longitudinal slot defined by flat side faces parallel to said axis of rotation, said body having means for direct supporting connection with a lathe chuck and the like, work-engageable means axially movable in the body, a tool carrier mounted for transverse movement in the work-engageable means and having flat parallel sides located between and slidably engaging the parallel side faces of the slot in said body, inclined means restricting the tool carrier to a path diametrical to the body, a tool mounted on the tool carrier, spring means yieldably urging the work-engageable means and tool carrier into their foremost positions relative to the body, a tool carried by the tool carrier and movable laterally therewith, means for varying the position of the path of lateral movement of the tool carrier relative to the work-engaging means, and said tool being axially slidable in said tool carrier and having a longitudinal keyway therealong, said tool carrier having a guide directed toward said keyway, and a tool-locking element comprising a shank slidably engaging said guide for longitudinal movement into and out of engagement with said keyway, said shank first engaging said guide for limited rotational movement of the shank relative to the keyway, whereby, when the body moves forwardly relative to the work-engageable means, the tool carrier will be caused to move laterally relative thereto and move the tool laterally relative to the body and the work-engageable means.

17. The structure in claim 16, and said shank having a threaded head swiveled thereto and said head being threadedly mounted in said tool carrier.

References Cited

UNITED STATES PATENTS

| | | | |
|---|---|---|---|
| 1,193,426 | 8/1916 | Rollinson et al. | 77—58.4 |
| 2,601,541 | 6/1952 | Maxwell | 77—58.4 |
| 2,848,912 | 8/1958 | Kalat | 77—58.4 |
| 2,945,404 | 7/1960 | Boumstark et al. | 77—58.4 |

LEONIDAS VLACHOS, *Primary Examiner.*